United States Patent
Terashima et al.

(10) Patent No.: US 8,120,285 B2
(45) Date of Patent: Feb. 21, 2012

(54) DRIVING METHOD FOR DISCHARGE LAMP, DRIVING DEVICE FOR DISCHARGE LAMP, LIGHT SOURCE DEVICE, AND IMAGE DISPLAY APPARATUS

(75) Inventors: Tetsuo Terashima, Chino (JP); Shigeyasu Soma, Muroran (JP); Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 12/627,124

(22) Filed: Nov. 30, 2009

(65) Prior Publication Data

US 2010/0134033 A1 Jun. 3, 2010

(30) Foreign Application Priority Data

Dec. 1, 2008 (JP) .................................. 2008-306287

(51) Int. Cl.
*G05F 1/00* (2006.01)

(52) U.S. Cl. ........ 315/308; 315/291; 315/292; 315/246; 315/360

(58) Field of Classification Search ............... 315/209 R, 315/246, 289, 291, 292, 224, 307, 308, 360, 315/DIG. 7; 353/30, 49, 85; 348/744
See application file for complete search history.

(56) References Cited

U.S. PATENT DOCUMENTS

| | | | |
|---|---|---|---|
| 5,365,151 A | 11/1994 | Spiegel et al. | |
| 7,023,144 B2 | 4/2006 | Suzuki et al. | |
| 7,508,144 B2 * | 3/2009 | Yamauchi et al. | 315/291 |
| 7,567,041 B2 * | 7/2009 | Okamoto | 315/292 |
| 7,944,150 B2 * | 5/2011 | Hirao | 315/224 |
| 7,999,481 B2 * | 8/2011 | Ono et al. | 315/224 |
| 7,999,490 B2 * | 8/2011 | Terashima et al. | 315/291 |
| 2002/0011803 A1 | 1/2002 | Derra et al. | |
| 2004/0000880 A1 | 1/2004 | Ozasa et al. | |
| 2004/0090184 A1 | 5/2004 | Arimoto et al. | |
| 2008/0024853 A1 | 1/2008 | Tanaka et al. | |
| 2009/0236998 A1 * | 9/2009 | Terashima et al. | 315/209 R |
| 2010/0123406 A1 * | 5/2010 | Soma et al. | 315/246 |
| 2010/0141634 A1 * | 6/2010 | Soma et al. | 345/212 |

FOREIGN PATENT DOCUMENTS

| | | |
|---|---|---|
| JP | 2003-059184 A | 2/2003 |
| JP | 2005-276623 A | 10/2005 |
| JP | 2006-059790 A | 3/2006 |
| JP | 2007-087637 | 4/2007 |
| JP | 2008-034187 A | 2/2008 |

OTHER PUBLICATIONS

European Search Report, Jan. 3, 2011, issued in related Patent Application No. EP-10189568.

* cited by examiner

*Primary Examiner* — Haiss Philogene
(74) *Attorney, Agent, or Firm* — AdvantEdge Law Group, LLC

(57) ABSTRACT

In at least one embodiment of the disclosure, a driving device for a discharge lamp includes an alternating current supply section and a frequency switching section. The alternating current supply section supplies two electrodes of the discharge lamp with an alternating current. The alternating current includes a plurality of modulation periods with each modulation period including a highest frequency term and a lowest frequency term. The frequency switching section varies a frequency of the alternating current non-monotonically between the highest frequency term and the lowest frequency term of the modulation period in response to a predetermined condition being satisfied.

14 Claims, 14 Drawing Sheets

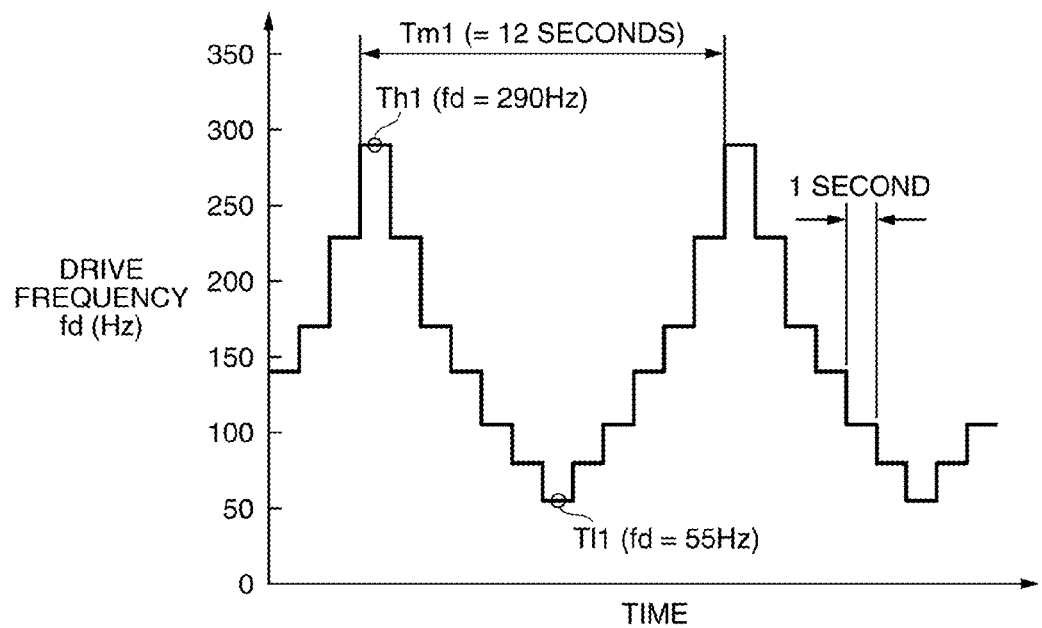

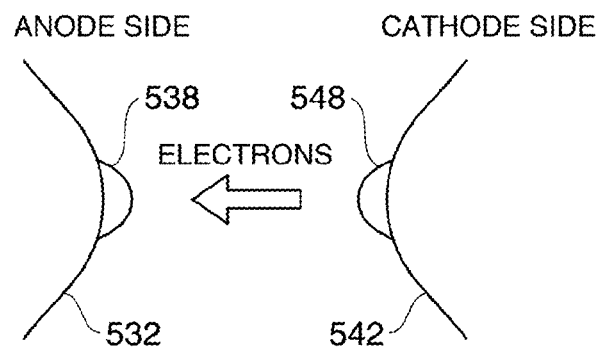
FIG. 5A  ANODE PERIOD OF PRIMARY MIRROR SIDE ELECTRODE
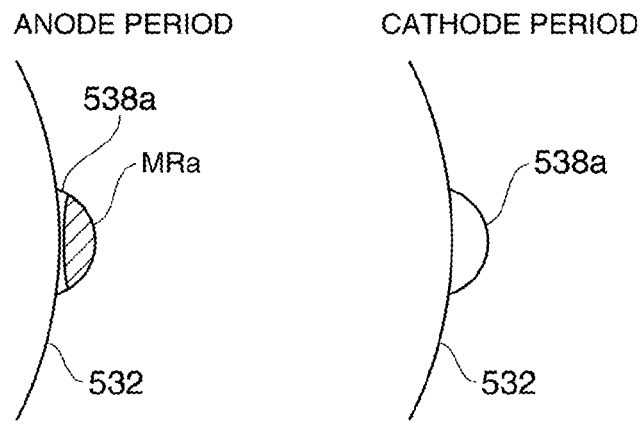
FIG. 5B  LOW FREQUENCY DRIVING
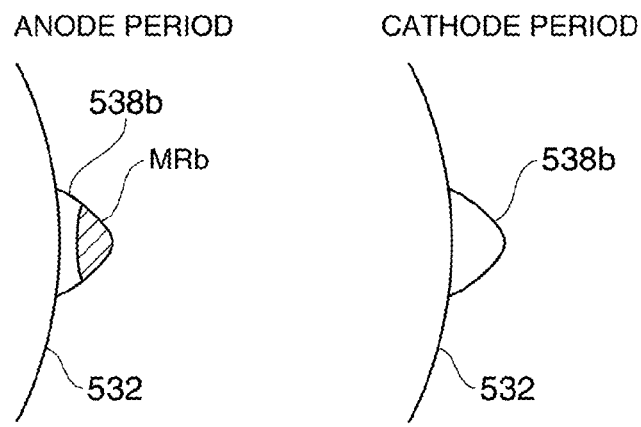
FIG. 5C  HIGH FREQUENCY DRIVING

DRIVING METHOD FOR DISCHARGE LAMP, DRIVING DEVICE FOR DISCHARGE LAMP, LIGHT SOURCE DEVICE, AND IMAGE DISPLAY APPARATUS

CROSS-REFERENCE

The present application claims priority from Japanese Patent Application No. 2008-306287 filed on Dec. 1, 2008 which is hereby incorporated by reference in its entirety.

BACKGROUND

High-intensity discharge lamps such as super-high pressure discharge lamps may be used as alight source in image display apparatuses such as projectors. In such super-high pressure discharge lamps, the distance between the electrodes for forming an arc increases with use, thereby deteriorating the light efficiency of the optical system, and thus, the illuminance of a display image by an image display apparatus such as a projector is deteriorated. To prevent such deterioration of the illuminance of the display image, it has been proposed to increase a lighting frequency every predetermined period of time in accordance with the rise in lamp voltage in view of the fact that the increase in the distance between the electrodes can be detected based on the rise in the lamp voltage (see, e.g., JP-A-2005-276623). By increasing the lighting frequency, a projection is re-created at the tip of each of the electrodes, thereby preventing the distance between the electrodes from increasing, thus the deterioration of illuminance of the display image can be prevented.

However, depending on the state of the super-high pressure discharge lamp, the lighting frequency is kept at a high level. In this case, so-called arc-jump, in which pluralization of the projections formed at the tip of the electrode associated with deformation or miniaturization of the projections is advanced, and movement of the position where the arc is formed might occur. Further, depending on the lighting frequency kept at a high frequency and the state of the electrodes such as the material or the shape, deterioration such as blackening, in which the electrode material is deposited inside the super-high pressure discharge lamp, might be advanced. Further, when the deterioration of the electrodes is further advanced, it may not be possible to prevent the distance between the electrodes from increasing only by using a constant high lighting frequency, and thus, the illuminance of the display image of the image display device such as a projector might be deteriorated. The same problem exists not only in super-high pressure lamps but also is common in various discharge lamps emitting light caused by arc discharge between the electrodes.

SUMMARY

Various embodiments of the disclosure make it possible to use the discharge lamp for a longer period of time, thereby making is possible to solve at least a part of the problem described above.

In certain embodiments there is provided a driving device for a discharge lamp including an alternating current supply section adapted to supply two electrodes of the discharge lamp with an alternating current, and a frequency switching section adapted to periodically switch a frequency of the alternating current supplied by the alternating current supply section, and the frequency switching section switches the frequency by differentiating values of the frequency in a plurality of terms in a switching period, and varies the frequency non-monotonically between a highest frequency term having a highest value of the frequency in the modulation period and a lowest frequency term having a lowest value of the frequency in the modulation period in response to a predetermined condition being satisfied.

In general, in the condition in which the frequency is low, since the projection is sufficiently melted to form a thick projection, the formation of minute projections can be prevented. Further, in the condition in which the frequency is high, the thick projection formed by the low frequency driving extends. Therefore, increase in the distance between the electrodes can be prevented, thereby preventing rise in the lamp voltage, and at the same time, the projection can be formed to have a shape suitable for stable generation of the arcs. Further, according to this aspect, by varying the frequency non-monotonically if the predetermined condition is satisfied, after the projection is sufficiently melted by the low frequency driving, the projection is extended by the high frequency driving. Since the extension of the projection is thus promoted, the rise in the lamp voltage is further restricted, and thus, it becomes possible to use the discharge lamp for a longer period of time.

According to a second aspect, the predetermined condition is determined based on a lamp voltage, which is a voltage between the two electrodes supplied with predetermined electrical power, and the frequency switching section varies the value of the frequency non-monotonically in response to the lamp voltage exceeding a predetermined reference value.

According to this aspect, by determining the predetermined condition based on the lamp voltage, the rise in the lamp voltage can more reliably be restricted.

According to a third aspect, the frequency switching section makes a variation in the value of the frequency obtained in response to the lamp voltage exceeding a predetermined upper threshold value higher than the reference value larger than a variation in the value of the frequency obtained in response to the lamp voltage underrunning the upper threshold value.

According to this aspect, by increasing the variation of the frequency when the lamp voltage exceeds the upper threshold voltage, growth of the projection can further be promoted, and thus, it becomes possible to more reliably restrict the rise in the lamp voltage.

According to a fourth aspect, the frequency switching section makes a variation range of the value of the frequency obtained in response to the lamp voltage underrunning a predetermined lower threshold value lower than the reference value narrower than a variation range in the value of the frequency obtained in response to the lamp voltage exceeding the lower threshold value.

According to this aspect, by narrowing the variation range of the frequency when the lamp voltage underruns the lower threshold value, the growth of the projection is restricted. Therefore, it becomes possible to prevent further decrease in the lamp voltage, and to prevent the blackening due to the increase in the current for supplying the predetermined electrical power.

According to a fifth aspect, a value of the frequency in the highest frequency term obtained in response to the lamp voltage underrunning a predetermined lower threshold value lower than the reference value is made lower than a value of the frequency in the highest frequency term obtained in response to the lamp voltage exceeding the lower threshold value.

According to this aspect, by lowering the frequency in the highest frequency term, the extension of the projection can be restricted, thus the growth of the projection can be restricted.

According to a sixth, a value of the frequency in the lowest frequency term obtained in response to the lamp voltage underrunning the lower threshold value is made higher than a value of the frequency in the lowest frequency term obtained in response to the lamp voltage exceeding the lower threshold value.

According to this aspect, by increasing the frequency in the lowest frequency term, the melting of the projection can be restricted, thus the growth of the projection can be restricted.

According to a seventh aspect, the predetermined condition is determined based on a deterioration state of the discharge lamp, and the frequency switching section varies the value of the frequency non-monotonically in response to determination that deterioration of the discharge lamp is in progress.

In general, when the discharge lamp is deteriorated, the distance between the electrodes increases, and the lamp voltage rises, and therefore, as a method of determining the predetermined condition based on the deterioration state of the discharge lamp, it is possible to determine that the deterioration state of the discharge lamp is advanced if the lamp voltage rises. It should be noted that it is also possible to determine the progress of the deterioration state of the discharge lamp by change in other parameters such as discharge lamp drive current, light intensity or illuminance in the optical system at a predetermined position as the predetermined condition based on the deterioration state of the discharge lamp.

According to an eighth aspect there is provided a driving device for a discharge lamp including an alternating current supply section adapted to supply two electrodes of the discharge lamp with an alternating current, and a frequency switching section adapted to periodically switch a frequency of the alternating current supplied by the alternating current supply section, and the frequency switching section switches the frequency by differentiating values of the frequency in a plurality of terms in a modulation period, and makes, in response to the predetermined condition being satisfied, a variation in the value of the frequency between two temporally consecutive terms of the plurality of terms larger than a variation in the value of the frequency between the two temporally consecutive terms obtained while the predetermined condition failing to be satisfied.

According to this aspect, by increasing the variation in the frequency between the two consecutive terms when the predetermined condition is satisfied, enhancement of fusibility in the low frequency driving and extension of the projection in the high frequency driving are further promoted. Since the extension of the projection is thus promoted also by the present aspect of the disclosure, the rise in the lamp voltage is further restricted, and thus, it becomes possible to use the discharge lamp for a longer period of time.

It should be noted that the disclosure can be put into practice in various forms. The disclosure can be put into practice in the forms of, for example, a driving device and a driving method for a discharge lamp, a light source device using a discharge lamp and a control method thereof, and an image display apparatus using the light source device.

BRIEF DESCRIPTION OF THE DRAWINGS

Non-limiting and non-exhaustive embodiments of the present disclosure will be described with reference to the accompanying drawings, wherein like numbers reference like elements.

FIGS. 4A and 4B are explanatory diagrams illustrating an example of a modulation pattern of a drive frequency.

FIGS. 5A, 5B, and 5C are explanatory diagrams illustrating how a shape of a primary mirror side electrode varies when driving the discharge lamp at different drive frequencies.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

A1. Configuration of Projector

Figure 1:
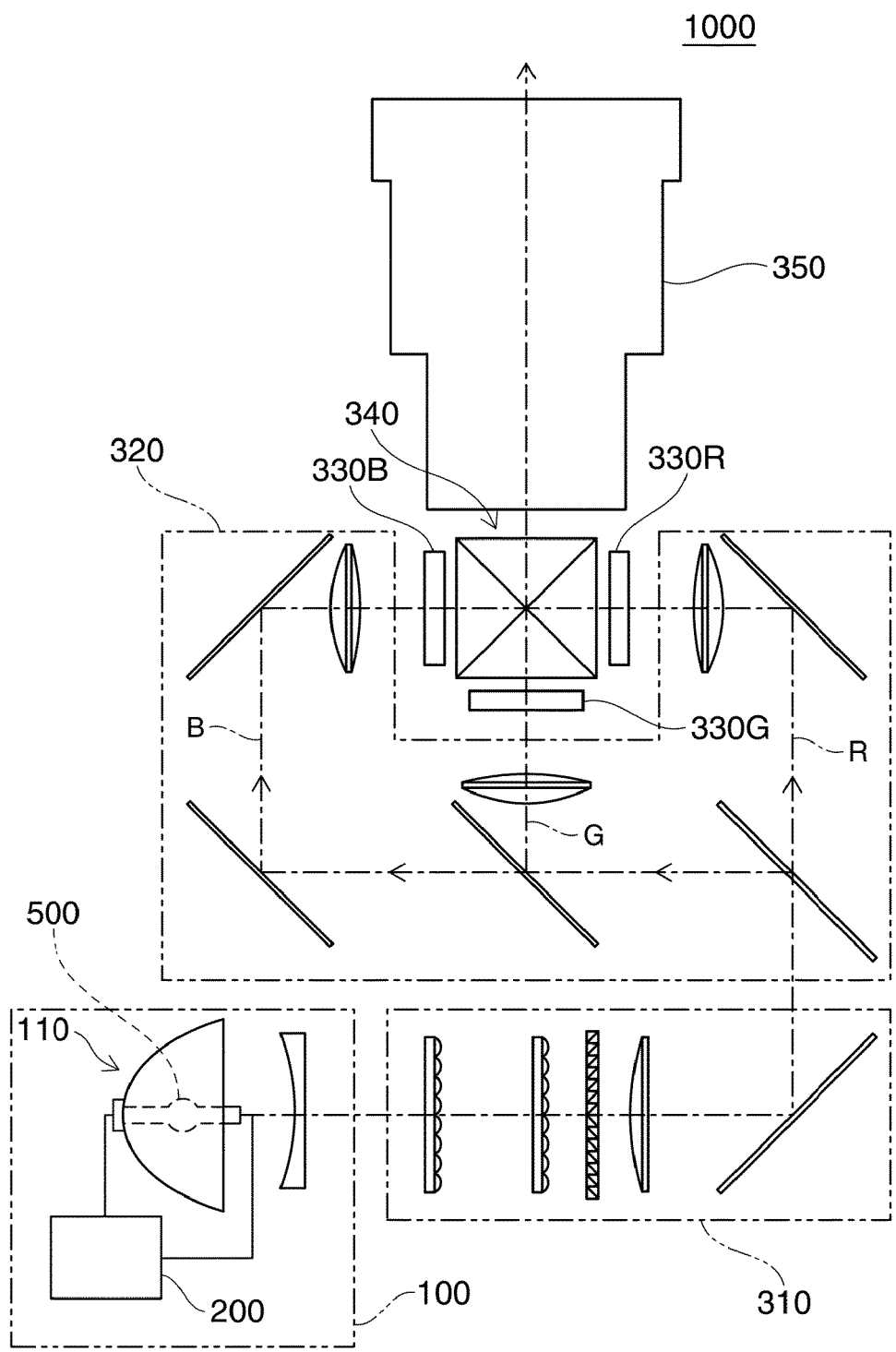
FIG. 1 is a schematic configuration diagram of a projector.

FIG. 1 is a schematic configuration diagram of a projector 1000 in accordance with certain embodiments. The projector 1000 includes a light source device 100, an illumination optical system 310, a color separation optical system 320, three liquid crystal light valves 330R, 330G, 330B, a cross dichroic prism 340, and a projection optical system 350.

The light source device 100 has a light source unit 110 attached with a discharge lamp 500, and a discharge lamp driving device 200 for driving the discharge lamp 500. The discharge lamp 500 is supplied with electric power by the discharge lamp driving device 200 to emit light. The light source unit 110 emits the light, which is emitted from the discharge lamp 500, toward the illumination optical system 310. It should be noted that specific configurations and specific functions of the light source unit 110 and the discharge lamp driving device 200 will be described later.

The illumination optical system 310 uniformizes the illuminance of the light emitted from the light source unit 110, and at the same time aligns the polarization direction thereof to one direction. The light with the illuminance uniformized through the illumination optical system 310 and with the polarization direction aligned therethrough is separated into three colored light beams of red (R), green (G), and blue (B) by the color separation optical system 320. The three colored light beams thus separated by the color separation optical system 320 are modulated by the respective liquid crystal light valves 330R, 330G, 330B. The three colored light beams respectively modulated by the liquid crystal light valves 330R, 330G, 330B are then combined by the cross dichroic prism 340, and enter the projection optical system 350. By the projection optical system 350 projecting the light beams, which have entered, on a screen not shown, an image is displayed on the screen as a full color picture obtained by combining the images respectively modulated by the liquid crystal light valves 330R, 330G, 330B. It should be noted that although in the present embodiment, the three liquid crystal light valves 330R, 330G, 330B individually modulate the respective three colored light beams, it is also possible to arrange that a single liquid crystal light valve provided with a color filter modulates the light beams. In this case, it becomes possible to eliminate the color separation optical system 320 and the cross dichroic prism 340.

A2. Configuration of Light Source Device

Figure 2:
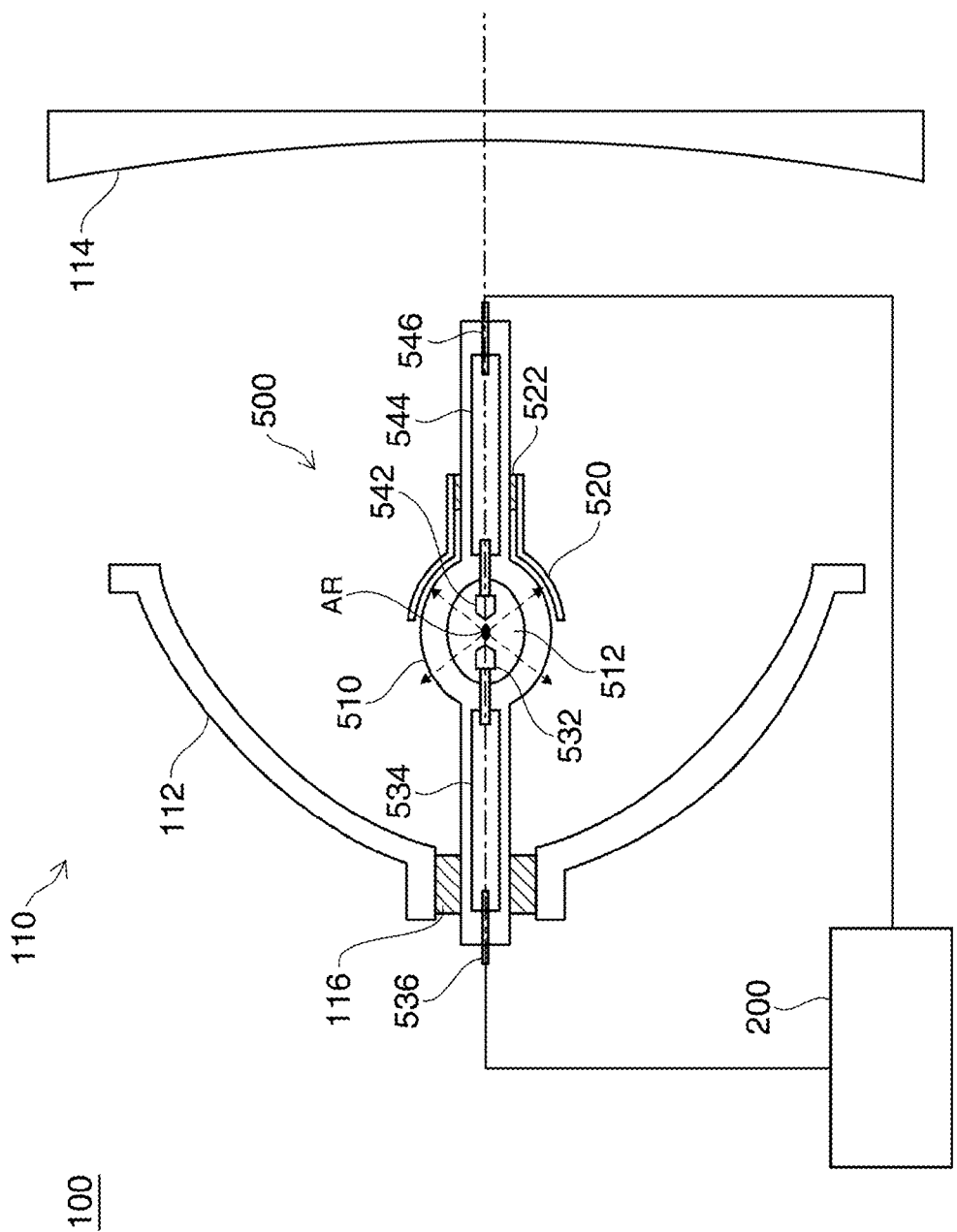
FIG. 2 is an explanatory diagram illustrating a configuration of a light source device.

FIG. 2 is an explanatory diagram showing a configuration of the light source device 100. As described above, the light source device 100 is provided with the light source unit 110 and the discharge lamp driving device 200. The light source unit 110 is provided with the discharge lamp 500, a primary reflecting mirror 112 having a spheroidal reflecting surface, and a collimating lens 114 for obtaining an approximately collimated light beam as the light beam emitted therefrom. It should be noted that the reflecting surface of the primary reflecting mirror 112 is not necessarily required to have a spheroidal shape. For example, the reflecting surface of the primary reflecting mirror 112 can have a paraboloidal shape. In this case, by placing the light emitting section of the discharge lamp 500 at a so-called focal point of the paraboloidal mirror, the collimating lens 114 can be eliminated. The primary reflecting mirror 112 and the discharge lamp 500 are bonded to each other with an inorganic adhesive 116.

The discharge lamp 500 is formed by bonding a discharge lamp main body 510 and a secondary reflecting mirror 520 having a spherical reflection surface to each other with an inorganic adhesive 522. The discharge lamp main body 510 is formed from, for example, a glass material such as quartz glass. The discharge lamp main body 510 is provided with two electrodes 532, 542 formed from a high-melting point electrode material such as tungsten, two connection members 534, 544, and two electrode terminals 536, 546. The electrodes 532, 542 are disposed so that the tip portions thereof are opposed to each other in a discharge space 512 formed at the central part of the discharge lamp main body 510. In the discharge space 512, there is encapsulated a gas including a noble gas, mercury or a metallic halide, and so on as a discharge medium. The connection members 534, 544 are members for electrically connecting the electrodes 532, 542 and the electrode terminals 536, 546 to each other, respectively.

The electrode terminals 536, 546 of the discharge lamp 500 are separately connected to the discharge lamp driving device 200. The discharge lamp driving device 200 supplies the electrode terminals 536, 546 with a pulsed alternating current (an alternating pulse current). When the alternating pulse current is supplied to the electrode terminals 536, 546, an arc AR occurs between the tip portions of the two electrodes 532, 542 disposed in the discharge space 512. The arc AR emits light in all directions from the point where the arc AR occurs. The secondary reflecting mirror 520 reflects the light, which is emitted toward the electrode 542, namely one of the electrodes 532, 542, toward the primary reflecting mirror 112. By thus reflecting the light, which is emitted toward the electrode 542, toward the primary reflecting mirror 112, a higher degree of parallelization of the light emitted from the light source unit 110 can be obtained. It should be noted that the electrode 542 on the side where the secondary reflecting mirror 520 is disposed is referred to also as a "secondary mirror side electrode 542," and the other electrode 532 is referred to also as a "primary mirror side electrode 532."

Figure 3:
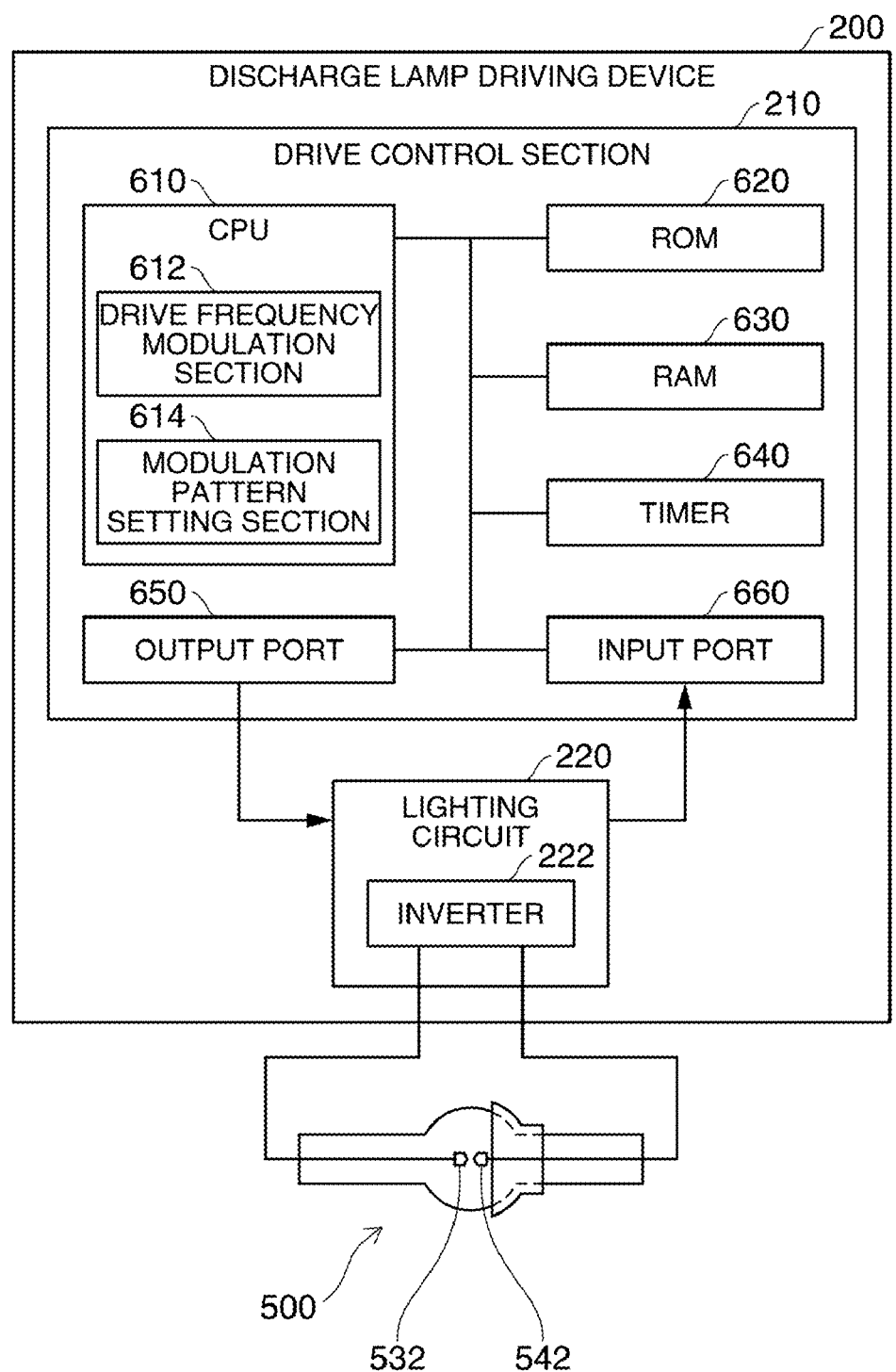
FIG. 3 is a block diagram illustrating a configuration of a discharge lamp driving device.

FIG. 3 is a block diagram showing a configuration of the discharge lamp driving device 200. The discharge lamp driving device 200 has a drive control section 210 and a lighting circuit 220. The drive control section 210 is configured as a computer provided with a CPU 610, a ROM 620, a RAM 630, a timer 640, an output port 650 for outputting a control signal to the lighting circuit 220, and an input port 660 for acquiring a signal from the lighting circuit 220. The CPU 610 of the drive control section 210 executes a program stored in the ROM 620 based on output signals from the timer 640, and the input port 660. Thus, the CPU 610 realizes the functions as a drive frequency modulation section 612 and a modulation pattern setting section 614. It should be noted that each of the functions of the drive frequency modulation section 612 and the modulation pattern setting section 614 realized by the CPU 610 will be described later.

The lighting circuit 220 has an alternating current supply section, such as an inverter 222, for generating an alternating pulse current. The lighting circuit 220 controls the inverter 222 based on the control signal supplied from the drive control section 210 via the output port 650. Specifically, the lighting circuit 220 makes the inverter 222 generate the alternating pulse current corresponding to feed conditions (e.g., a frequency and a pulse waveform of the alternating pulse current) designated by the control signal. The inverter 222 generates the alternating pulse current with constant power (e.g., 200 W) to be supplied to the discharge lamp 500 in accordance with the feed conditions designated by the lighting circuit 220, and supplies the discharge lamp 500 with the alternating pulse current thus generated.

The lighting circuit 220 is also configured so as to detect the voltage (the lamp voltage) between the electrodes 532, 542 when supplying the discharge lamp 500 with the alternating pulse current with the constant power. In general, when the discharge lamp 500 is lighted, the electrodes 532, 542 are consumed, and the tips thereof are planarized. When the tips of the electrodes 532, 542 are planarized, the distance between the electrodes 532, 542 is increased. Therefore, when the discharge lamp 500 is deteriorated and the consumption of the electrode 532 is advanced, the voltage (the lamp voltage) between the electrodes 532, 542 required for driving the discharge lamp 500 with the constant power rises. Therefore, the deterioration condition of the discharge lamp 500 can be detected by detecting the lamp voltage. When the electrodes 532, 542 are consumed and the tips thereof are planarized, the arc occurs taking a random position in the planarized area as the origin. Therefore, when the tips of the electrodes 532, 542 are planarized, there occurs so-called arc-jump in which the generation position of the arc is moved.

The drive frequency modulation section 612 of the drive control section 210 sets the frequency (the drive frequency) fd of the alternating pulse current, which the lighting circuit 220 outputs, in accordance with the modulation pattern set by the modulation pattern setting section 614. In this manner, the drive frequency of the discharge lamp 500 is switched by the drive frequency modulation section 612 and the modulation pattern setting section 614. Therefore, the drive frequency modulation section 612 and the modulation pattern setting section 614 can collectively be called a "drive frequency switching section" or "frequency switching section." It should be noted that as described later, the modulation pattern setting section 614 changes the modulation pattern to be set in accordance with the lamp voltage.

A3. Drive Frequency Modulation for Discharge Lamp

FIGS. 4A and 4B are explanatory diagrams showing an example of a modulation pattern of the drive frequency fd to be set by the modulation pattern setting section 614. FIG. 4A is a graph showing a time variation of the drive frequency fd. In the modulation pattern shown in FIG. 4A, the modulation period Tm1 (12 seconds) is divided into 12 terms with a length of 1 second. In this modulation pattern, the drive frequency fd varies monotonically in a plurality of terms (intermediate frequency terms) between the term (the lowest frequency term) Tl1 in which the drive frequency fd takes the lowest value and the term (the highest frequency term) Th1 in which the drive frequency fd takes the highest value.

FIG. 4B shows the time variation of a current (a lamp current) Ip supplied to the discharge lamp 500 in each of the lowest frequency term Tl1 and the highest frequency term Th1 of the modulation pattern shown in FIG. 4A. In FIG. 4B, the positive direction of the lamp current Ip represents the direction of the current flowing from the primary mirror side electrode 532 toward the secondary mirror side electrode 542. Specifically, the primary mirror side electrode 532 acts as an anode in periods Tal, Tah in which the lamp current Ip takes a positive value, while in periods Tcl, Tch in which the lamp current Ip takes a negative value, the primary mirror side electrode 532 acts as a cathode. It should be noted that hereinafter the period in which one of the electrodes acts as an anode is also referred to as an "anode period" of that electrode, and the period in which one of the electrodes acts as a cathode is also referred to as a "cathode period" of that electrode.

As shown in FIG. 4A, the drive frequency fd (290 Hz) in the highest frequency term Th1 is set to be about 5.3 times of the drive frequency fd (55 Hz) in the lowest frequency term Tl1. Therefore, as shown in FIG. 4B, a switching period Tpl with which the polarity of the lamp current Ip is switched in the lowest frequency term Tl1 is set to be about 5.3 times as long as the switching period Tph in the highest frequency term Th1. Further, the anode period Tal and the cathode period Tcl of the primary mirror side electrode 532 in the lowest frequency term Tl1 are set to be about 5.3 times as long as the anode period Tah and the cathode period Tch thereof in the highest frequency term Th1, respectively.

As shown in FIG. 4B, in the present embodiment, an anode duty ratio of each of the primary mirror side electrode 532 and the secondary mirror side electrode 542 is set to be 50%. Here, the anode duty ratio of the primary mirror side electrode 532 denotes the ratio in length of the anode period Tal (Tah) of the primary mirror side electrode 532 with respect to the switching period Tpl (Tph). Further, the anode duty ratio of the secondary mirror side electrode 542 denotes the ratio in length of the anode period of the secondary mirror side electrode 542, namely the cathode period Tcl (Tch) of the primary mirror side electrode 532, with respect to the switching period Tpl (Tph). It is not necessarily required to set the anode duty ratios of the both electrodes 532, 542 to be the same. For example, in the case of using the discharge lamp 500 having the secondary reflecting mirror 520 as shown in FIG. 2, it is also possible to set the anode duty ratio of the secondary mirror side electrode 542 to be lower than 50%, namely the anode duty ratio of the primary mirror side electrode 532 to be higher than 50%, in consideration of the fact that the heat radiation from the secondary mirror side electrode 542 becomes difficult. As described later, since the heat generation in an electrode occurs during the anode period of the electrode, the value of the heat generated in one of the electrodes increases as the anode duty ratio of the electrode rises. Therefore, from the viewpoint of the possibility of preventing the excessive temperature rise of the secondary mirror side electrode 542, in at least one embodiment the anode duty ratio of the secondary mirror side electrode 542, which has difficulty in heat radiation therefrom, is set to be lower than 50%.

FIGS. 5A, 5B, and 5C are explanatory diagrams showing how the shape of the primary mirror side electrode 532 varies when driving the discharge lamp 500 with different drive frequencies fd as shown in FIG. 4A. As shown in FIG. 5A, the electrodes 532, 542 are respectively provided with projections 538, 548 toward the opposed electrode. FIG. 5B shows the state of the primary mirror side electrode 532 in the case in which the drive frequency fd is low. FIG. 5C shows the state of the primary mirror side electrode 532 in the case in which the drive frequency fd is high.

FIG. 5A shows the states of the two electrodes 532, 542 in the anode period of the primary mirror side electrode 532. As shown in FIG. 5A, in the anode period of the primary mirror side electrode 532, electrons are emitted from the secondary mirror side electrode 542 and then collide against the primary mirror side electrode 532. In the primary mirror side electrode 532 acting as the anode, since the kinetic energy of the electrons having collided is converted into heat energy, the temperature rises. In contrast, in the secondary mirror side electrode 542 acting as the cathode, since no collision of the electrons occurs, the temperature decreases due to heat conduction and heat radiation. In the similar manner, in the anode period (i.e., the cathode period of the primary mirror side electrode 532) of the secondary mirror side electrode 542, the temperature of the secondary mirror side electrode 542 rises, while the temperature of the primary mirror side electrode 532 decreases.

In the anode period of the primary mirror side electrode 532, since the temperature of the primary mirror side electrode 532 rises, a melted portion where the electrode material is melted is caused in the projection 538 of the primary mirror side electrode 532. Subsequently, when the cathode period of the primary mirror side electrode 532 comes, the temperature of the primary mirror side electrode 532 decreases, and solidification of the melted portion caused in the tip portion of the projection 538 begins. By the melted portion thus appearing in each of the projections 538, 548 and then being solidified, the projections 538, 548 are maintained to have the shape convex toward the opposed electrode.

FIGS. 5B and 5C show an influence the drive frequency fd exerts on the shapes of the projections. When the drive frequency fd is low, temperature rise occurs in a large area of the projection 538a of the primary mirror side electrode 532 in the anode state. Further, when the drive frequency fd is low, the force applied to the melted portion MRa due to the potential difference from the secondary mirror side electrode 542 opposed thereto is also applied to a large area of the melted section MRa. Therefore, as shown in FIG. 5B, a flat melted portion MRa is formed in the projection 538 of the primary mirror side electrode 532 in the anode state. Then, when the primary mirror side electrode 532 is switched to the cathode, the melted portion MRa is solidified to form the projection 538a with a flat shape. In the manner as described above, when the drive frequency fd is low, flattening of the shape of the projection 538a progresses. Therefore, if the state in which the drive frequency fd is low continues, the flattening of the projection 538a progresses to cause the projection 538a to disappear.

In contrast, when the drive frequency fd is high, the range where the temperature rise occurs in the projection 538b of the primary mirror side electrode 532 in the anode state is reduced, and thus the melted portion MRb smaller than in the case with the lower drive frequency fd is provided to the projection 538b. Further, the force applied to the melted portion MRb of the projection 538b is concentrated to the center of the melted portion MRb. Therefore, as shown in FIG. 5C, the melted portion MRb provided to the projection 538 is tapered toward the secondary mirror side electrode 542 opposed thereto, and therefore, the shape of the projection 538b obtained by solidifying the melted portion MRb in the cathode period also becomes tapered. As described above, since the shape of the projection 538b is becoming tapered during the time in which the drive frequency fd is high, if the state in which the drive frequency fd is high continues, the miniaturization of the projection 538b progresses, and a minute projection easily deformed is formed.

Therefore, in the present embodiment, by modulating the drive frequency fd in the modulation period Tm1 (FIG. 4A), generation of the minute projection caused by continuously performing the high-frequency driving, and disappearance of the projection due to the continuous low-frequency driving are prevented, and the projection 538 is maintained in a more preferable state. As described above, in the case in which the drive frequency fd is low, since the projection 538a is sufficiently melted, the projection 538a becomes large. In contrast, in the case in which the drive frequency fd is high, extension of the projection 538b toward the opposed electrode is promoted. Therefore, since the projection 538a becomes large in the low frequency driving mode, and the projection 538b extends in the high frequency driving mode, the projection having a shape suitable for stabilizing the generation position of the arc, such as a conical shape, can be formed by modulating the drive frequency fd. It should be noted that in the case in which the frequency is sequentially varied along the modulation pattern shown in FIG. 4A, since the phenomenon in the case in which the drive frequency fd is high and the phenomenon in the case of the low drive frequency are repeated continuously, it looks to the eye that the projections 538, 548 on the tips of the electrodes 532, 542 are kept to have shapes suitable for stabilizing the generation position of the arc, such as a conical shape, and it is difficult to observe the actual state in which the projection 538a becomes large in the low frequency driving mode and the projection 538b extends in the high frequency driving mode.

Further, in the modulation pattern shown in FIG. 4A, there are provided the time with intermediate drive frequency fd varying monotonically between the lowest frequency term Tl1 and the highest frequency term Th1. Therefore, after the projection 538a becomes large, the projection having become large varies sequentially to have a tapered shape. Since the large projection is thus varied sequentially to have a tapered shape, the projection with a more preferable shape may more reliably be formed.

A4. Setting of Modulation Pattern

Figure 6:
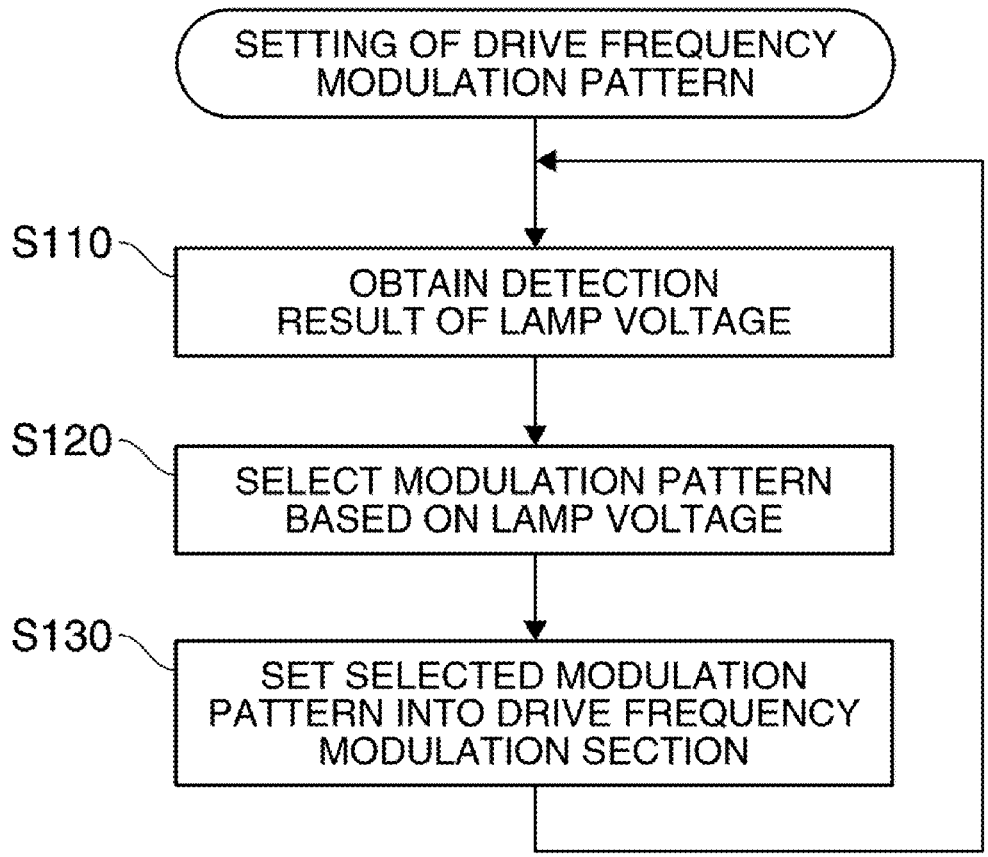
FIG. 6 is a flowchart illustrating a flow of a process of a modulation pattern setting section setting the modulation pattern of the drive frequency.

FIG. 6 is a flowchart showing a flow of a process of a modulation pattern setting section 614 setting the modulation pattern of the drive frequency. This process is constantly executed in the discharge lamp driving device 200 during, for example, the starting up time of the projector 1000 or the time in which the discharge lamp 500 is in a lighting state. It should be noted that the process of setting the modulation pattern of the drive frequency is not necessarily required to be executed on a steady basis. For example, it is also possible to arrange that the timer 640 (FIG. 3) is configured to generate an interval signal every time the lighting time of the discharge lamp 500 elapses a predetermined amount of time (e.g., 10 hours), and the CPU 610 executes the process of setting the modulation pattern upon reception of the interval signal.

In the step S110, the modulation pattern setting section 614 obtains the lamp voltage, which is acquired by the CPU 610 via the input port 660. Subsequently, in the step S120, the modulation pattern setting section 614 selects the modulation pattern based on the lamp voltage thus obtained. Specifically, the modulation pattern setting section 614 looks up the data stored in memory such as the ROM 620 or the RAM 630 and providing correspondence between the ranges of the lamp voltage and the modulation patterns, thereby selecting the modulation pattern. The data includes a predetermined reference value, a predetermined upper threshold value, and a predetermined lower threshold value as further described below. In the step S130, the modulation pattern setting section 614 sets the modulation pattern thus selected into the drive frequency modulation section 612. Thus the drive frequency fd is modified with the pattern set in accordance with the lamp voltage Vp. After the step S130, the control is returned to the step S110, and the steps S110 through S130 are executed repeatedly.

FIGS. 7 through 11 are explanatory diagrams showing an example of the modulation patterns set in accordance with the lamp voltage Vp. In the present embodiment, as the modulation patterns, five types of patterns are used in accordance with the lamp voltage Vp.

Figure 7:
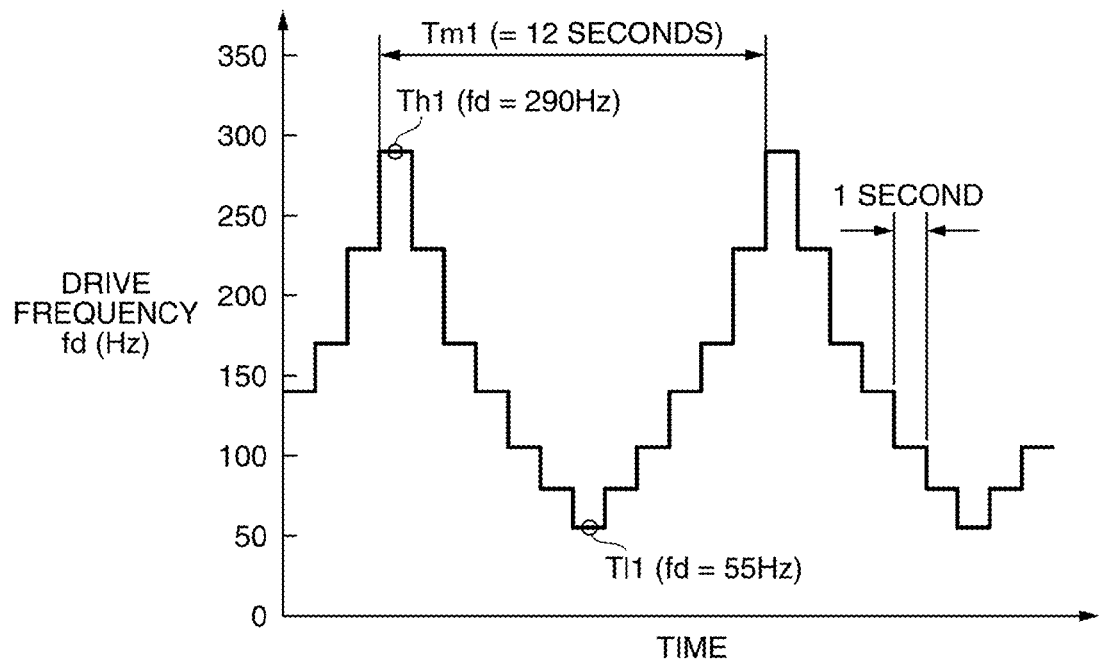
FIG. 7 is an explanatory diagram illustrating an example of a modulation pattern set in accordance with a lamp voltage.

FIG. 7 shows the modulation pattern to be set when the lamp voltage Vp is in a range of 70 through 80V. In the present embodiment, the discharge lamp 500 having an initial lamp voltage of 75V is used. Therefore, at the point of starting to use the discharge lamp 500, the drive frequency fd is modulated along the modulation pattern shown in FIG. 7. It should be noted that the modulation pattern shown in FIG. 7 is the same as the modulation pattern shown in FIG. 4A, and therefore, the explanation therefor will be omitted.

Figure 8:
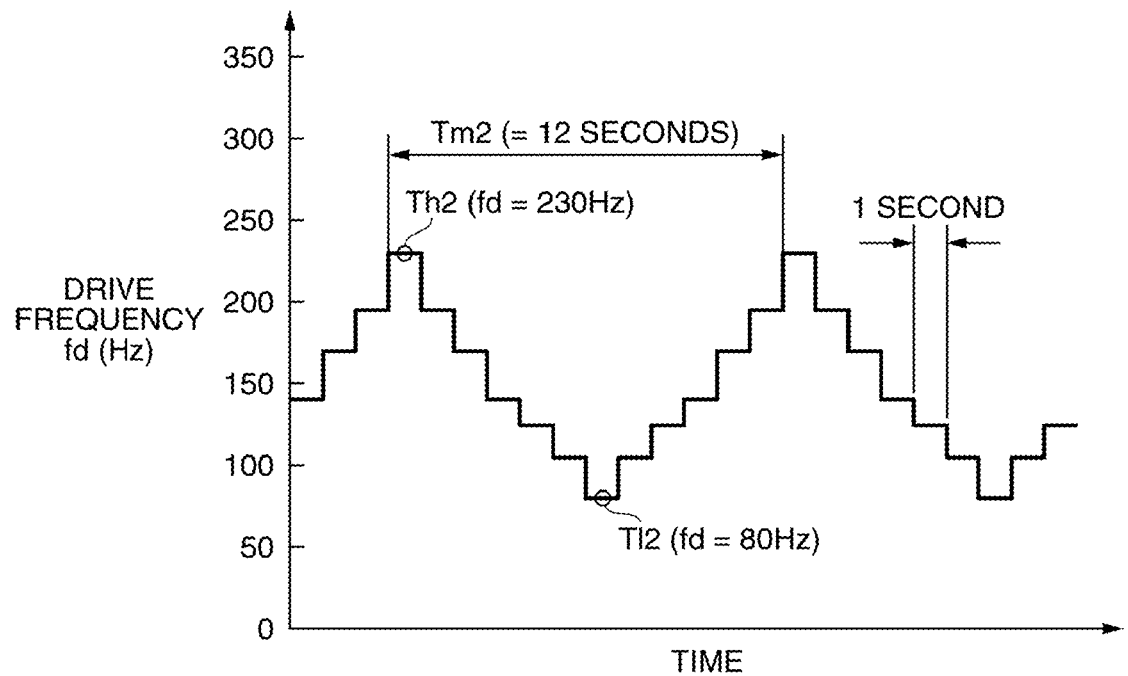
FIG. 8 is an explanatory diagram illustrating an example of the modulation pattern set in accordance with the lamp voltage.

As described above, the lamp voltage Vp rises as the electrodes 532, 542 are consumed with use of the discharge lamp 500. However, depending on the drive conditions, there might be the case in which the projections 538, 548 on the tips of the respective electrodes 532, 542 grow, thereby lowering the lamp voltage Vp from the level thereof at the point of starting to use the discharge lamp 500. FIG. 8 shows the modulation pattern to be set when the lamp voltage Vp is thus lowered to underrun 70V.

Also in the modulation pattern shown in FIG. 8, similarly to the modulation pattern shown in FIG. 7, the modulation period Tm2 (12 seconds) is divided into 12 terms each having a length of 1 second. Further, in the intermediate frequency terms between the lowest frequency term Tl2 and the highest frequency term Th2, the drive frequency fd varies monotonically.

On the other hand, the drive frequency fd in the highest frequency term Th2 is set to have a value (230 Hz) lower than the drive frequency fd (290 Hz) in the highest frequency term Th1 in the modulation pattern shown in FIG. 7. Further, the drive frequency fd in the lowest frequency term Tl2 is set to have a value (80 Hz) higher than the drive frequency fd (55 Hz) in the lowest frequency term Tl1 in the modulation pattern shown in FIG. 7.

By thus narrowing the modulation range of the drive frequency fd, the formation of the large projection in the low frequency driving mode and the extension of the projection in the high frequency driving mode can be reduced. Therefore, further growth of the projections 538, 548 can be prevented. It should be noted that although in the example shown in FIG. 8, the drive frequency fd (=230 Hz) in the highest frequency term Th2 is set to be lower than the drive frequency fd (=290 Hz) in the highest frequency term Th1 in the modulation pattern shown in FIG. 7, it is not necessarily required to set the drive frequency fd in the highest frequency term Th2 to be lower. Also in the setting described above, since the drive frequency fd in the lowest frequency term Tl2 becomes higher, thereby reducing melting of the projections in the low frequency driving mode, it becomes possible to prevent the growth of the projections 538, 548. It should be noted that in at least one embodiment the drive frequency fd in the highest frequency term Th2 is set to be lower in view of the fact that the growth of the projections 538, 548 may more reliably be prevented.

By narrowing the modulation range of the drive frequency fd to restrict the growth of the projections 538, 548 when the lamp voltage Vp is lowered, increase in the lamp current Ip due to the further decrease in the lamp voltage Vp can be prevented. Therefore, it becomes possible to prevent the blackening of the inside of the discharge lamp 500 due to the increase in the lamp current Ip. Further, by preventing the increase in the lamp current Ip, it becomes possible to reduce the thermal load of a ballast circuit forming the inverter 220. It should be noted that by monotonically varying the drive frequency fd in the intermediate frequency terms between the lowest frequency term Tl2 and the highest frequency term Th2 also in the modulation pattern shown in FIG. 8, it becomes possible to prevent disappearance of the projection due to the continuous low frequency driving and generation of the minute projection due to the continuous high frequency driving, thereby maintaining the projections thus formed to have more preferable shapes.

By preventing the growth of the projections 538, 548 using the modulation pattern shown in FIG. 8, the lamp voltage Vp rises with use of the discharge lamp 500. Then, when the lamp voltage Vp exceeds a predetermined lower threshold value (70V in the present embodiment), the modulation pattern shown in FIG. 7 is set. Thus, the growth of the projections 538, 548 is promoted, and the rise of the lamp voltage Vp due to the consumption of the electrodes 532, 542 can be prevented.

Figure 9:
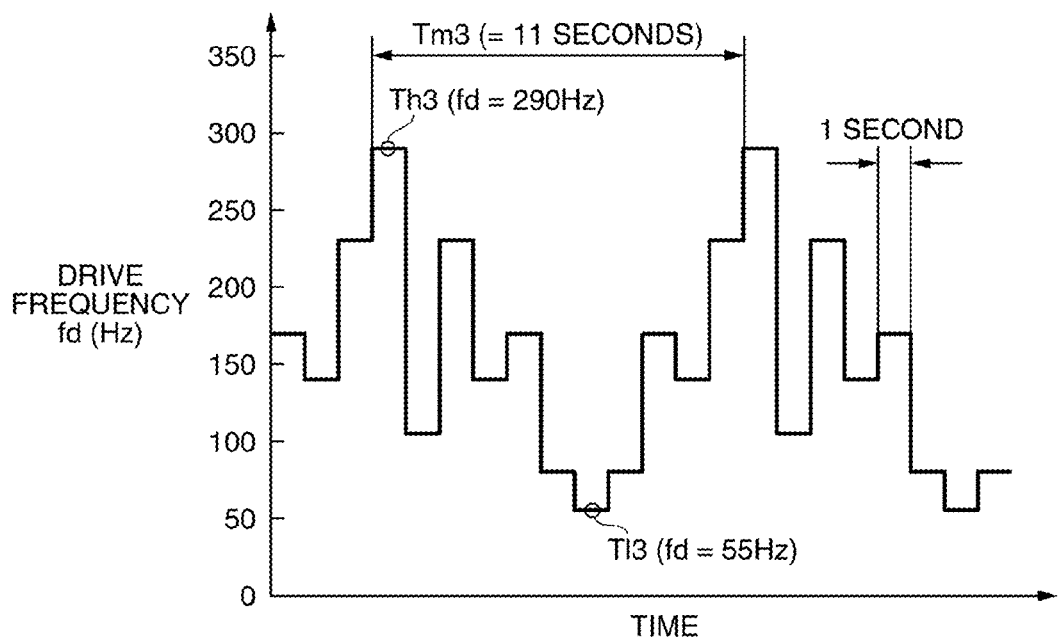
FIG. 9 is an explanatory diagram illustrating an example of the modulation pattern set in accordance with the lamp voltage.

FIG. 9 shows the modulation pattern to be set when the lamp voltage Vp rises with increase in the cumulative lighting time of the discharge lamp to exceed 80V. In the modulation pattern shown in FIG. 9, the modulation period Tm3 (11 seconds) is divided into 11 terms each having a length of 1 second. In the modulation pattern shown in FIG. 9, unlike the modulation patterns shown in FIGS. 7 and 8, a term with the high drive frequency fd and a term with the low drive frequency fd are set alternately in the intermediate frequency terms between the lowest frequency term Tl3 and the highest frequency term Th3. By providing the term with the high drive frequency fd and the term with the low drive frequency fd alternately, the drive frequency fd varies non-monotonically in the time of the intermediate frequency terms. By varying the drive frequency fd non-monotonically as described above, in the state in which the fusibility of the projection 538a is enhanced due to the low frequency driving as shown in FIG. 5B, extension of the projection 538b is promoted due to the high frequency driving as shown in FIG. 5C. Therefore, the extension of the projection 538b toward the secondary mirror side electrode 542 is promoted, thus the rise of the lamp voltage Vp is prevented. Further, since the arc occurs at the position of the tapered projection 538b formed by performing the high frequency driving, the temperature at the position of the projection rises. Therefore, the arc is apt to occur at the projection 538b, which is formed in the high frequency driving mode, also in the low frequency driving mode, thus the central position of the projection 538a in the low frequency driving mode is determined, and it becomes possible to prevent the migration of the projection.

It should be noted that varying non-monotonically denotes that when varying the frequency in a direction from the frequency (the highest frequency) in the highest frequency term to the frequency (the lowest frequency) in the lowest frequency term, or in a direction from the lowest frequency to the highest frequency, the frequency is varied in an opposite direction to the varying direction. For example, it is also possible to vary the drive frequency fd non-monotonically by interchanging the orders of the two or more of the intermediate frequency terms in the case of varying the drive frequency fd gradually in one direction. Further, non-monotone can also be described as the state in which a sum of the variations in a specific direction when varying the frequency in a direction from the highest frequency to the lowest frequency or a direction from the lowest frequency to the highest frequency is larger than the difference between the highest frequency and the lowest frequency. It is also possible to arrange that the modulation pattern for varying the drive frequency fd non-monotonically is defined by a waveform obtained by overlapping a waveform with a frequency higher than a basic waveform on the basic waveform (a triangular wave in the example shown in FIG. 7) obtained by connecting the temporal center point of each of the terms comprised in the modulation pattern when the drive frequency fd is graphed with the drive frequency fd on the y-axis and the time on the x-axis. In this case, as the waveform with the higher frequency to be overlapped, a noise waveform such as a white noise of a blue noise can also be adopted. Further, the modulation pattern can be defined by a waveform having a 1/f fluctuation characteristic.

Figure 10:
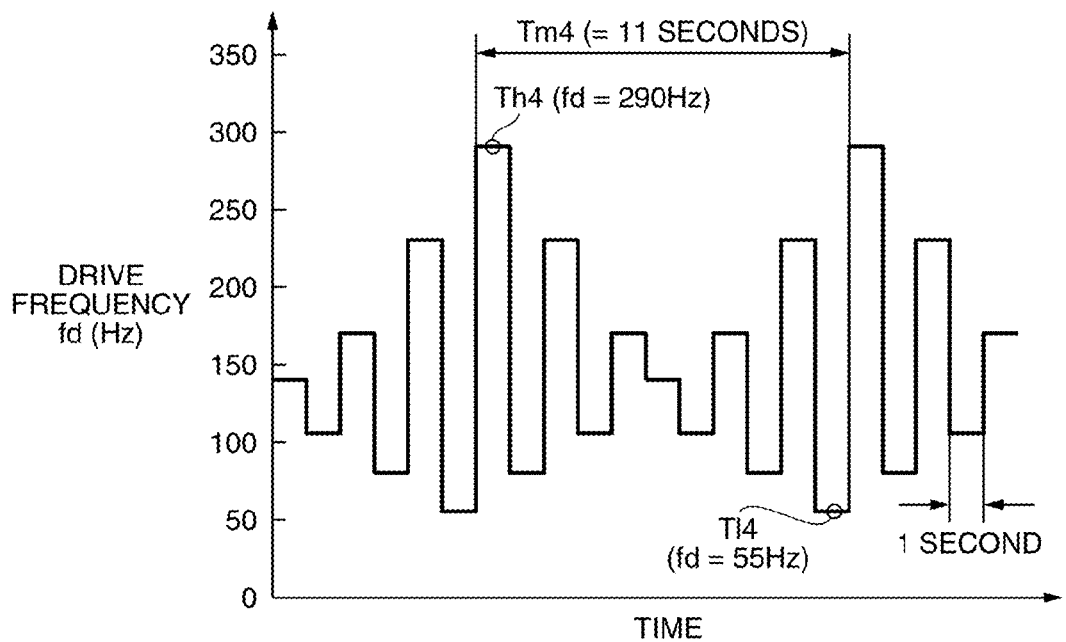
FIG. 10 is an explanatory diagram illustrating an example of the modulation pattern set in accordance with the lamp voltage.

FIG. 10 shows the modulation pattern to be set when the lamp voltage Vp further rises to exceed a predetermined upper threshold value (a first upper threshold value in the present embodiment is 90V). In the modulation pattern shown in FIG. 10, the modulation period Tm4 (11 seconds) is divided into 11 terms each having a length of 1 second. In the modulation pattern shown in FIG. 10, in each of the anterior half and the posterior half of the modulation period Tm4, a frequency higher than a predetermined frequency (150 Hz in the example shown in FIG. 10) and a frequency lower than the predetermined frequency are set alternately. Thus, similar to the modulation pattern shown in FIG. 9, in the intermediate frequency terms between the lowest frequency term Tl4 and the highest frequency term Th4, the drive frequency fd varies non-monotonically.

In the modulation pattern shown in FIG. 10, the variation of the drive frequency fd becomes larger than that of the modulation pattern shown in FIG. 9. Therefore, in the state in which the fusibility of the projection 538a is further enhanced, the extension of the projection 538b due to the high frequency driving is further promoted. Therefore, the growth of the projection is further promoted compared to the case in which the modulation pattern shown in FIG. 9 is set. Further, by providing the intermediate frequency terms, it becomes possible to prevent the state in which the variation of the drive frequency fd is large from continuing, thereby preventing the deterioration such as blackening, which might occur in the case in which the variation of the drive frequency fd is large, from progressing. Further, by providing the intermediate frequency terms, the highest frequency term Th4 and the lowest frequency term Tl4 in the modulation period Tm4 are reduced, and thus, it becomes possible to prevent generation of the minute projection formed in the high frequency driving mode, and at the same time, to prevent flickers apt to be generated in the low frequency driving mode.

Figure 11:
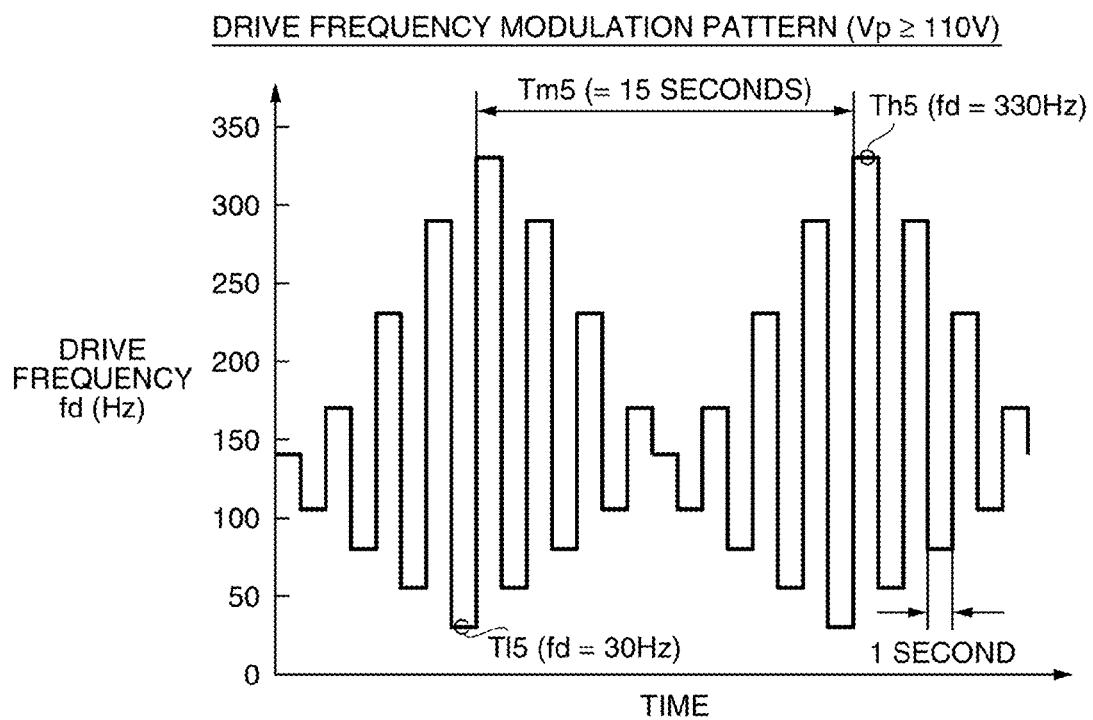
FIG. 11 is an explanatory diagram illustrating an example of the modulation pattern set in accordance with the lamp voltage.

FIG. 11 shows the modulation pattern to be set when the lamp voltage Vp further rises to exceed a predetermined upper threshold value (a second upper threshold value in the present embodiment is 110V). In the modulation pattern shown in FIG. 11, the modulation period Tm5 (15 seconds) is divided into 15 terms each having a length of 1 second. In the modulation pattern shown in FIG. 11, the modulation range of the drive frequency fd is expanded by adding to the modulation pattern shown in FIG. 10 the lowest frequency term Tl5 with a lower frequency, the highest frequency term Th5 with a higher frequency, and two intermediate frequency terms disposed before and behind these two terms Tl5, Th5. Also in the modulation pattern shown in FIG. 11, in each of the anterior half and the posterior half of the modulation period Tm5, a frequency higher than a predetermined frequency (150 Hz in the example shown in FIG. 11) and a frequency lower than the predetermined frequency are set alternately. Thus, similar to the modulation pattern shown in FIG. 10, in the intermediate frequency terms between the lowest frequency term Tl5 and the highest frequency term Th5, the drive frequency fd varies non-monotonically.

It should be noted that although in the modulation pattern shown in FIG. 11, the modulation range of the drive frequency fd is expanded by adding four terms with the high frequency and the low frequency to the modulation pattern shown in FIG. 10, it is also possible to expand the modulation range of the drive frequency fd using other methods. For example, it is also possible to set the drive frequency fd in the highest frequency term Th4 to be higher, and the drive frequency fd in the lowest frequency term Tl4 to be lower in the modulation pattern shown in FIG. 10. Further, it is also possible to arrange that the modulation range of the drive frequency fd is expanded by extending the entire modulation pattern shown in FIG. 10 in the frequency axis direction.

As described above, in the modulation pattern shown in FIG. 11, the variation of the drive frequency fd becomes much larger than that of the modulation pattern shown in FIG. 10. Therefore, the growth of the projection is further promoted compared to the case in which the modulation pattern shown in FIG. 10 is set. Further, similarly to the modulation pattern shown in FIG. 10, by providing the intermediate frequency terms, it becomes possible to prevent the deterioration such as blackening from progressing, to prevent generation of the minute projection formed in the high frequency driving mode, and at the same time, to prevent flickers apt to be generated in the low frequency driving mode.

As described above, according to the present embodiment, the modulation patterns are switched in accordance with the lamp voltage Vp. Further, in the case in which the lamp voltage Vp exceeds a predetermined reference value (80V in the present embodiment), the drive frequency fd is varied non-monotonically in the intermediate frequency terms between the highest frequency term and the lowest frequency term, thereby promoting the growth of the projections 538, 548. Therefore, the rise in the lamp voltage Vp due to the consumption of the electrodes 532, 542 can be prevented, thus it becomes possible to use the discharge lamp for a longer period of time.

Although in the embodiment, the five modulation patterns to be set in accordance with the lamp voltage Vp are shown, it is sufficient to vary the drive frequency fd non-monotonically between the highest frequency term and the lowest frequency when the lamp voltage Vp exceeds the predetermined voltage, the setting value of the drive frequency fd in each of the modulation patterns, the forms of the modulation patterns, the number of the modulation patterns, and the threshold values of the lamp voltage Vp for switching the modulation patterns can arbitrarily be modified. Further, although in the five modulation patterns described above the term of time (step time) during which the drive frequency fd is set to be a constant value is set to be 1 second, and the modulation period Tm1 through Tm5 are divided into 12, 12, 11, 11, and 15 terms, respectively, it is also possible to arbitrarily modify the step time, the lengths of the modulation periods, the number of times of switching of the drive frequency in each of the modulation periods. In this case, it is also possible to arrange that the step time is varied in every setting value of the drive frequency fd.

It should be noted from FIGS. 7 through 11, in the modulation patterns of the present embodiment, the variation in the drive frequency fd between the two temporally consecutive terms such as the highest frequency term Th1 through Th5 and the term subsequent to the highest frequency term. Th1 through Th5 is set to be increased as the lamp voltage Vp rises. By thus increasing the variation in the drive frequency fd between the two consecutive terms, the enhancement of the fusibility of the projections 538, 548 due to the low frequency driving and the extension of the projections 538, 548 due to the high frequency driving can further be promoted. Therefore, the effect of suppressing the rise of the lamp voltage Vp becomes stronger as the lamp voltage Vp rises.

It should be noted that although in the embodiment, the modulation pattern of the drive frequency fd is set in accordance with the lamp voltage Vp, it is also possible to set the modulation pattern in accordance with the consumption state of the electrodes 532, 542, that is, the deterioration state of the discharge lamp 500. The deterioration state of the discharge lamp 500 can be detected by various methods. For example, it is also possible to detect the deterioration state of the discharge lamp 500 based on the occurrence of the arc-jump due to the planarization of the projections 538, 548. Further, it is also possible to detect the deterioration state of the discharge lamp 500 based on the reduction of the light intensity available for image display caused by the degradation of the light efficiency in the optical system of the image display apparatus such as a projector due to the increase in the distance between the projections 538, 548. The generation of the arc-jump and the reduction of the light intensity can be detected using an optical sensor such as a photodiode disposed close to the discharge lamp 500.

B. Modified Example of Drive Waveform

Figure 12:
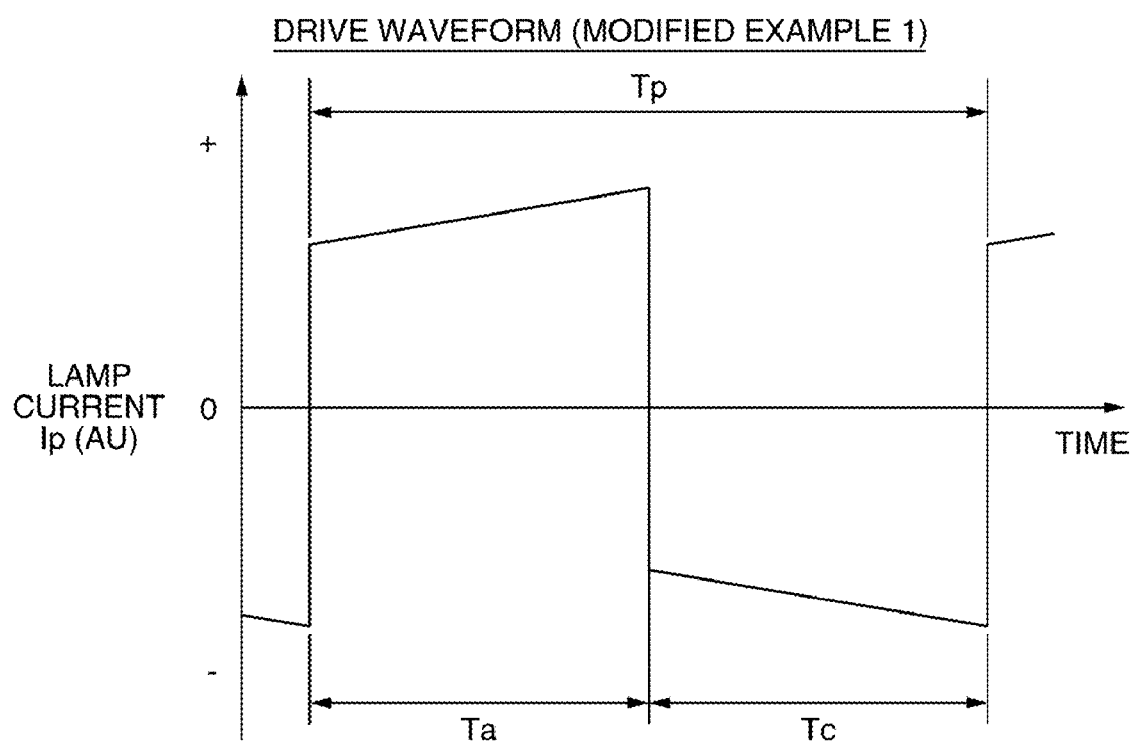
FIG. 12 is an explanatory diagram illustrating a first modified example of a drive waveform.
Figure 13:
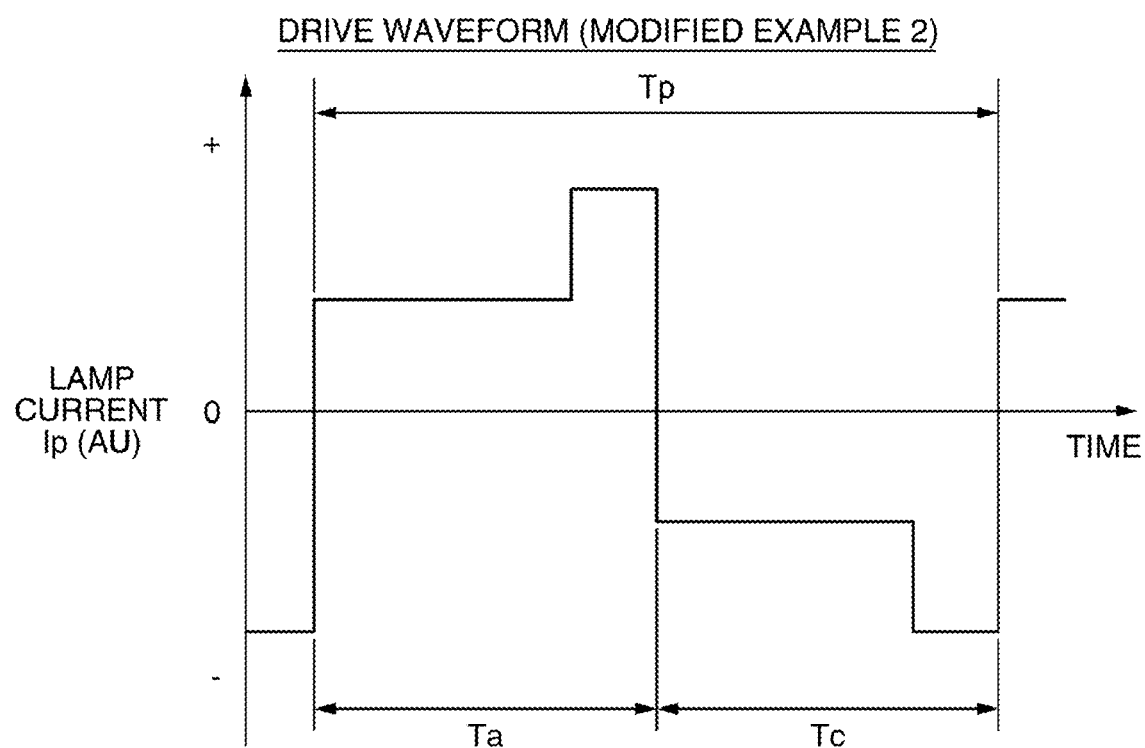
FIG. 13 is an explanatory diagram illustrating a second modified example of the drive waveform.
Figure 14:
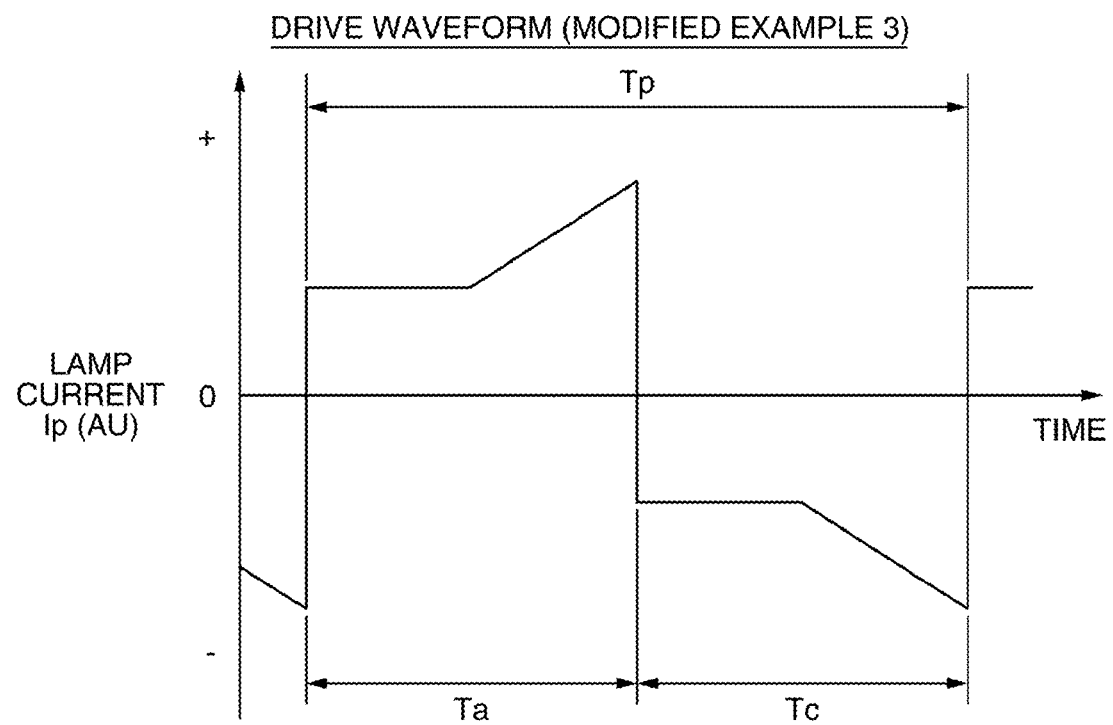
FIG. 14 is an explanatory diagram illustrating a third modified example of the drive waveform.

Although in the embodiment described above, a rectangular wave is used as the drive waveform representing the time variation of the lamp current Ip as shown in FIG. 4B, various types of waveforms can be used as the drive waveform besides the rectangular wave. FIGS. 12 through 14 show examples of the drive waveform, which can be used instead of the drive waveform shown in FIG. 4B. It should be noted that in FIGS. 12 through 14, the anode period of the primary mirror side electrode 532 is denoted as a symbol Ta, and the cathode period thereof is denoted as a symbol Tc.

A first modified example of the drive waveform shown in FIG. 12 is a waveform obtained by overlapping a ramp wave with the same frequency as a rectangular wave on the rectangular wave. A second modified example of the drive waveform shown in FIG. 13 is a waveform obtained by overlapping a rectangular wave on the rectangular wave in the posterior-most ¼ period of each of the periods Ta, Tc. A third modified example of the drive waveform shown in FIG. 14 is a waveform obtained by overlapping a ramp wave on the rectangular wave in the posterior half period of each of the period Ta, Tc.

As described above, various types of waveforms can be used as the drive waveform. It should be noted that if the drive waveforms other than the rectangular wave are used, the drive waveform and the drive frequency fd are appropriately selected taking, for example, the variation in the illuminance and frequency of generation of the scroll noise into consideration.

As shown in FIGS. 12 through 14, by setting the absolute value of the lamp current Ip in the posterior end of each of the periods Ta, Tc having the same polarity to be larger than the absolute value of an average lamp current of each of the periods Ta, Tc, the temperature of the electrodes 532, 542 when the polarity of the electrodes 532, 542 is switched from the anode to the cathode can be raised. Therefore, it becomes possible to sufficiently melt the periphery of the projections 538, 548, thus the growth of the projections can further be promoted.

C. Modified Example

It should be noted that the disclosure is not limited to the embodiments or the specific examples described above, but can be put into practice in various forms within the scope or the spirit of the disclosure. By way of example, the following modifications are also possible.

Although in the embodiment described above the liquid crystal light valves 330R, 330G, 330B are used as the light modulation sections in the projector 1000 (FIG. 1), it is also possible to use other arbitrary modulation sections such as digital micromirror devices (DMD is a trademark of Texas Instruments) as the light modulation sections. Further, the disclosure may also be applied to various types of image display devices, exposure devices, illumination devices, and so on, including liquid crystal display devices, as long as the devices use the discharge lamp as the light source. Therefore, it is manifestly intended that embodiments in accordance with the present disclosure be limited only by the claims and the equivalents thereof.

What is claimed is:

1. A driving device for a discharge lamp, comprising:
an alternating current supply section configured to supply two electrodes of the discharge lamp with an alternating current, the alternating current comprising a plurality of modulation periods with each modulation period including a highest frequency term and a lowest frequency term; and
a frequency switching section configured to vary a frequency of the alternating current supplied by the alternating current supply section non-monotonically between the highest frequency term and the lowest frequency term of the modulation period in response to a predetermined condition being satisfied.

2. The driving device according to claim 1, further including
a memory in which a predetermined reference value is stored and
wherein
the two electrodes are supplied with a predetermined electrical power,
the predetermined condition is based on a lamp voltage between the two electrodes, and
the frequency switching section varies the frequency non-monotonically in response to the lamp voltage exceeding the reference value.

3. The driving device according to claim 2, wherein
a predetermined upper threshold value that is larger than the reference value is stored in the memory,
the each modulation period includes a plurality of terms including the highest frequency term, the lowest frequency term and at least one intermediate frequency term between the highest frequency term and the lowest frequency term,
the variation in the frequency between the two temporally consecutive terms in the modulation period when the frequency switching section varies the frequency in response to the lamp voltage exceeding the upper threshold value is larger than the variation in the frequency between the two temporally consecutive terms in the modulation period when the frequency switching section varies the frequency in response to the lamp voltage falling below the threshold voltage.

4. The driving device according to claim 2, wherein the difference in the frequency between the highest frequency term and the lowest frequency term in the modulation period increases as the lamp voltage increases.

5. The driving device according to claim 2, wherein the frequency of the alternating current in the modulation period is varied monotonically when the lamp voltage falls below the reference value.

6. The driving device according to claim 2, wherein
a predetermined lower threshold value that is lower than the reference value is stored in the memory,
the variation in the frequency between the highest frequency term and the lowest frequency term in the modulation period when the frequency switching section varies the frequency in response to the lamp voltage underrunning the lower threshold value is narrower than the variation in the frequency between the highest frequency term and the lower frequency term in the modulation period when the frequency switching section varies the frequency in response to the lamp voltage exceeding the lower threshold value.

7. The driving device according to claim 6, wherein the frequency in the highest frequency term when the lamp voltage underruns the lower threshold value is adjusted lower than the frequency in the highest frequency term when the lamp voltage exceeds the lower threshold value.

8. The driving device according to claim 6, wherein the frequency in the lowest frequency term in the modulation period when the lamp voltage underruns the lower threshold value is adjusted higher than the frequency in the lowest frequency term in the modulation period when the lamp voltage exceeds the lower threshold value.

9. The driving device according to claim 1, wherein the predetermined condition is based on a deterioration state of the discharge lamp, and the frequency switching section varies the frequency non-monotonically in response to a deterioration of the discharge lamp.

10. The driving device according to claim 1, wherein each modulation period is comprised of a plurality of switching periods having non-rectangular waveforms, each switching period having at least one anode period and one cathode period and an absolute value of the alternating current for a posterior end of each of the anode periods and cathode periods is larger than an absolute value of an average alternating current for each of the anode periods and cathode periods, respectively.

11. A driving device for a discharge lamp, comprising:
an alternating current supply section configured to supply two electrodes of the discharge lamp with an alternating current having a frequency, the alternating current comprising a plurality of modulation periods with each modulation period including a plurality of terms; and
a frequency switching section configured to vary the frequency of the alternating current supplied by the alternating current supply section,
wherein the frequency switching section varies, in response to a predetermined condition being satisfied, the frequency of the modulation periods such that the variation in the frequency between two temporally consecutive terms in the modulation period is larger than the variation in the frequency between two temporally consecutive terms in the modulation period when the predetermined condition fails to be satisfied.

12. A light source device comprising:
a discharge lamp;
an alternating current supply section configured to supply two electrodes of the discharge lamp with an alternating current to light the discharge lamp, the alternating current comprising a plurality of modulation periods with each modulation period including a highest frequency term and a lowest frequency term; and
a frequency switching section configured to vary a frequency of the alternating current supplied by the alternating current supply section non-monotonically between the highest frequency term and the lowest frequency term in response to a predetermined condition being satisfied.

13. An image display apparatus comprising:
a discharge lamp as a light source configured to display an image;
an alternating current supply section configured to supply two electrodes of the discharge lamp with an alternating current to light the discharge lamp, the alternating current comprising a plurality of modulation periods with each modulation period including a highest frequency term and a lowest frequency term; and
a frequency switching section configured to vary a frequency of the alternating current supplied by the alternating current supply section non-monotonically between the highest frequency term and the lowest frequency term in response to a predetermined condition being satisfied.

14. A driving method for a discharge lamp comprising:
supplying an alternating current to two electrodes of the discharge lamp, the alternating current comprising a plurality of modulation periods with each modulation period including a highest frequency term and a lowest frequency term; and
varying the frequency of the alternating current non-monotonically between the highest frequency term and the lowest frequency term of the modulation periods in response to a predetermined condition being satisfied.

* * * * *